US012098672B2

(12) United States Patent
Tsuji et al.

(10) Patent No.: US 12,098,672 B2
(45) Date of Patent: Sep. 24, 2024

(54) INTERNAL COMBUSTION ENGINE ABNORMALITY DIAGNOSIS DEVICE

(71) Applicant: TOYOTA JIDOSHA KABUSHIKI KAISHA, Toyota (JP)

(72) Inventors: Tomoyuki Tsuji, Nagakute (JP); Naoya Okubo, Chiryu (JP); Tomonori Satoh, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/331,257

(22) Filed: Jun. 8, 2023

(65) Prior Publication Data

US 2024/0068399 A1 Feb. 29, 2024

(30) Foreign Application Priority Data

Aug. 29, 2022 (JP) ................................ 2022-135931

(51) Int. Cl.
*F02B 77/08* (2006.01)
*F01M 13/02* (2006.01)
(Continued)

(52) U.S. Cl.
CPC ......... *F02B 77/083* (2013.01); *F01M 13/028* (2013.01); *F02D 41/22* (2013.01);
(Continued)

(58) Field of Classification Search
CPC ................ F02B 77/083; F01M 13/028; F01M 2013/0083; F01M 2013/027; F01M 31/00;
(Continued)

(56) References Cited

U.S. PATENT DOCUMENTS

2010/0147270 A1* 6/2010 Pursifull .............. F01M 13/028 123/521
2014/0081551 A1* 3/2014 Rollinger ............... F01M 11/10 701/101

(Continued)

FOREIGN PATENT DOCUMENTS

JP 2020-186702 A 11/2020

OTHER PUBLICATIONS

U.S. Appl. No. 18/312,004, filed May 4, 2023, Tsuji et al.

*Primary Examiner* — Syed O Hasan
(74) *Attorney, Agent, or Firm* — Oblon, McClelland, Maier & Neustadt, L.L.P.

(57) ABSTRACT

A diagnosis device is intended for an internal combustion engine including a supercharger, a blow-by gas passage that communicates between a portion of an intake passage and a crankcase, a PCV pressure sensor that detects a PCV pressure in the blow-by gas passage, and a crankshaft. The device executes specifying a specific period for which the amount of fluctuations in the intake air amount per unit time is a prescribed value or more on condition that the intake air amount is a determination air amount or more, calculating the amount of fluctuations in the PCV pressure during the specific period, and determining, based on the amount of fluctuations in the PCV pressure, the presence of an abnormality in the blow-by gas passage. The device sets the determination air amount to a smaller value when the rotational speed of the crankshaft is high than when the rotational speed is low.

2 Claims, 4 Drawing Sheets

(51) Int. Cl.
*F02D 41/22* (2006.01)
*F01M 13/00* (2006.01)

(52) U.S. Cl.
CPC ............... *F01M 2013/0083* (2013.01); *F01M 2013/027* (2013.01); *F02D 2250/08* (2013.01)

(58) Field of Classification Search
CPC .. F02D 41/22; F02D 2250/18; F02D 41/0025; G07C 5/0808
See application file for complete search history.

(56) References Cited

U.S. PATENT DOCUMENTS

2020/0256225 A1* 8/2020 Sekiguchi ........ F02M 35/10006
2020/0362787 A1* 11/2020 Tsuji ...................... F01M 13/04

* cited by examiner

FIG. 6A
FIG. 6B
FIG. 6C
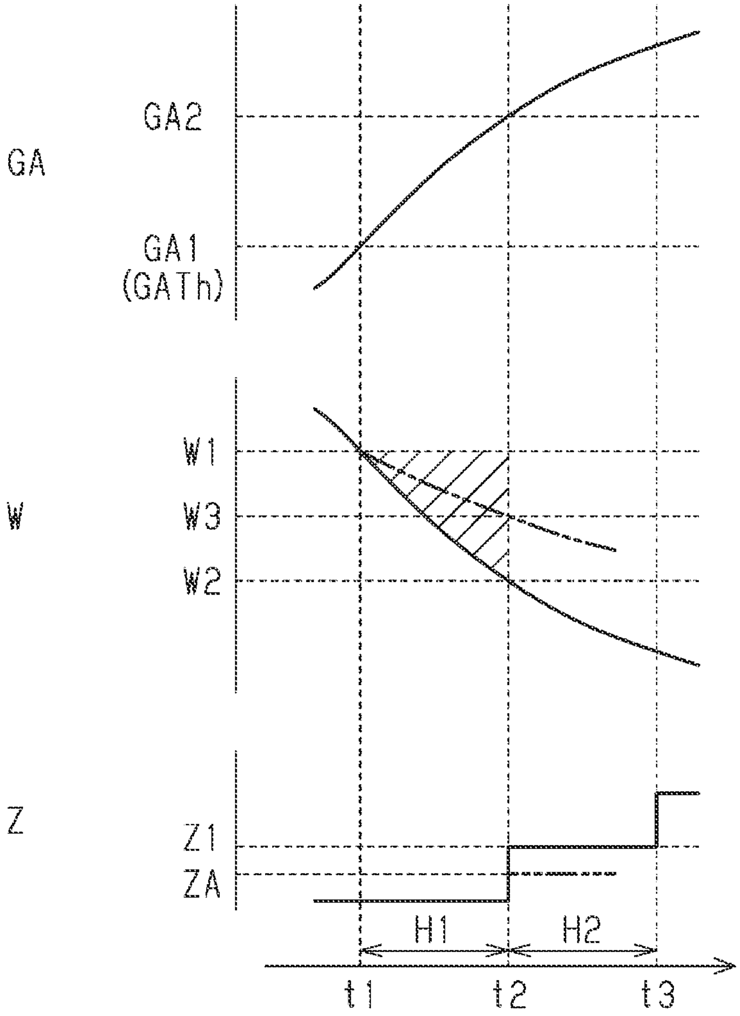
FIG. 7
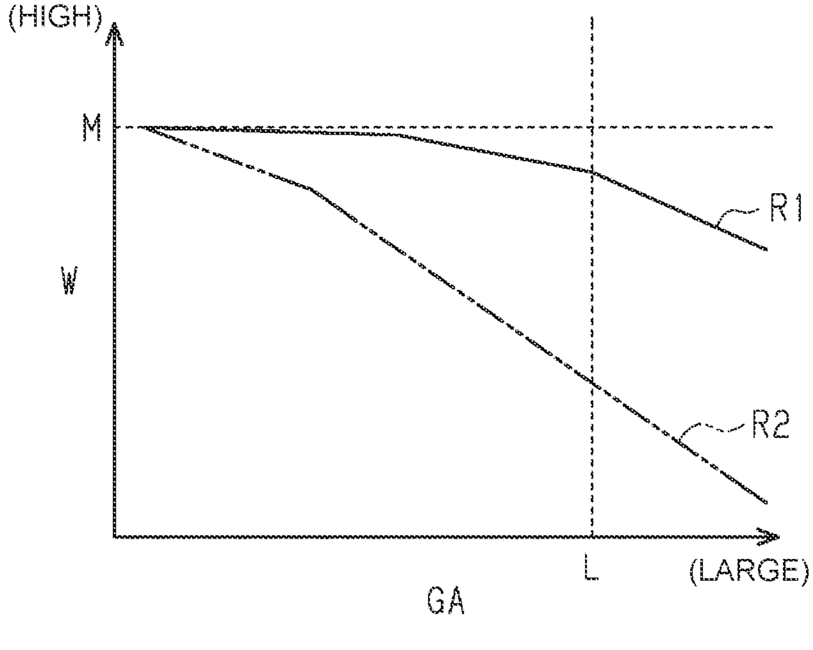

INTERNAL COMBUSTION ENGINE ABNORMALITY DIAGNOSIS DEVICE

CROSS-REFERENCE TO RELATED APPLICATION

This application claims priority to Japanese Patent Application No. 2022-135931 filed on Aug. 29, 2022, incorporated herein by reference in its entirety.

BACKGROUND

1. Technical Field

The present disclosure relates to an internal combustion engine abnormality diagnosis device.

2. Description of Related Art

Japanese Unexamined Patent Application Publication No. 2020-186702 (JP 2020-186702 A) discloses an internal combustion engine and an abnormality diagnosis device for an internal combustion engine. The internal combustion engine includes a supercharger, a blow-by gas storage space, a blow-by gas passage, and a positive crankcase ventilation (PCV) pressure sensor. A compressor wheel of the supercharger is positioned in an intake passage. The storage space is a space defined by a cylinder head and a cylinder head cover. The storage space communicates with the inside of a crankcase. Thus, the storage space can temporarily store a blow-by gas that has leaked out of cylinders into the crankcase. The blow-by gas passage connects between the storage space and a portion (hereinafter referred to simply as an "upstream portion") of the intake passage upstream of the compressor wheel. The PCV pressure sensor detects a pressure in the blow-by gas passage.

When intake air is pressurized by driving the supercharger in the internal combustion engine, the upstream portion of the intake passage is subjected to a negative pressure with respect to the atmospheric pressure. In this case, the blow-by gas flows into the upstream portion of the intake passage through the blow-by gas passage. It is assumed that the intake air amount is varied in the above situation in which the blow-by gas flows into the upstream portion of the intake passage. When the pressure in the upstream portion of the intake passage is varied accordingly, the amount of the blow-by gas that flows into the intake passage is varied, and the pressure in the blow-by gas passage is also varied. Such variations in the intake air amount and variations in the pressure in the blow-by gas passage that occur in conjunction with each other become particularly conspicuous when the intake air amount is considerably large and the negative pressure in the upstream portion is high to a certain degree.

In such a background, the abnormality diagnosis device disclosed in JP 2020-186702 A monitors fluctuations in the pressure in the blow-by gas passage for a diagnosis of an abnormality in the blow-by gas passage on condition that the intake air amount is equal to or more than a determination value determined in advance. The abnormality diagnosis device determines that an abnormality is caused in the blow-by gas passage when fluctuations in the pressure in the blow-by gas passage are small.

SUMMARY

The abnormality diagnosis according to JP 2020-186702 A is made on the assumption that the negative pressure in the upstream portion of the intake passage is high to a certain degree. The magnitude of the negative pressure caused in the upstream portion for an equal intake air amount is not always uniform, but may be different in accordance with the operating state of the internal combustion engine. In consideration of this respect, it is conceivable to set the determination value for the intake air amount for prescribing a condition for executing an abnormality diagnosis to be considerably large, in order to always extract a situation in which the negative pressure in the upstream portion is high as a target period for an abnormality diagnosis, irrespective of the operating state of the internal combustion engine. In this case, however, the condition for executing an abnormality diagnosis is not easily met. When the determination value for the intake air amount is set to be small, on the other hand, the execution condition is met in a situation in which the intake air amount and the pressure in the blow-by gas passage are not varied in conjunction with each other. Thus, it is necessary to set, as a condition for executing an abnormality diagnosis, a condition that allows detecting that the intake air amount and the pressure in the blow-by gas passage are varied in conjunction with each other and that does not excessively reduce the opportunity to execute an abnormality diagnosis.

In order to address the foregoing issue, an internal combustion engine abnormality diagnosis device is intended for an internal combustion engine that includes a supercharger, a blow-by gas passage that communicates between a portion of an intake passage upstream of a compressor wheel of the supercharger and an inside of a crankcase, a positive crankcase ventilation (PCV) pressure sensor that is installed in the blow-by gas passage and that detects a pressure in the blow-by gas passage as a PCV pressure, and a crankshaft; the internal combustion engine abnormality diagnosis device executes a first process of specifying, as a specific period, a period for which an amount of fluctuations in an intake air amount per unit time is equal to or more than a prescribed value on condition that the intake air amount is equal to or more than a determination air amount, a second process of calculating an amount of fluctuations in the PCV pressure during the specific period, and a third process of determining, based on the amount of fluctuations in the PCV pressure, presence or absence of an abnormality in a portion of the blow-by gas passage on the intake passage side with respect to a location at which the PCV pressure sensor is installed; and the internal combustion engine abnormality diagnosis device sets the determination air amount to a smaller value when a rotational speed of the crankshaft is high than when the rotational speed of the crankshaft is low.

Basically, the following holds true in a situation in which the blow-by gas passage is normal. That is, when the rotational speed of the crankshaft is low, the amount of fluctuations in the PCV pressure during the specific period may become large only when the intake air amount is large to a certain degree. When the rotational speed of the crankshaft is high, on the other hand, the amount of fluctuations in the PCV pressure during the specific period may become large, whether the intake air amount is small or large. In the above configuration, in consideration of this respect, the determination air amount is rendered smaller when the rotational speed of the crankshaft is high than when the rotational speed of the crankshaft is low. Thus, a situation in which the amount of fluctuations in the PCV pressure during the specific period can be detected with high precision, whether the rotational speed of the crankshaft is low or high. In the above configuration, moreover, the execution condition is met not only in a certain specific range of the intake air amount, but also in a wide range of the intake air amount that is varied in accordance with the rotational speed of the crankshaft. Specifically, the range of the intake air amount in which the third process can be executed is expanded when the rotational speed of the crankshaft is high. From the above, the opportunity to execute the third process can be secured as much as possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a time chart illustrating an example of transitions of a parameter during the diagnosis process;

FIG. 6B is a time chart illustrating an example of transitions of a parameter during the diagnosis process;

FIG. 6C is a time chart illustrating an example of transitions of a parameter during the diagnosis process; and FIG. 7 illustrates the relationship between the intake air amount and the PCV pressure in two different ranges of the engine rotational speed at the time when blow-by gas piping is normal.

DETAILED DESCRIPTION OF EMBODIMENTS

An internal combustion engine abnormality diagnosis device according to an embodiment will be described below with reference to the drawings.

Schematic Configuration of Internal Combustion Engine

Figure 1:
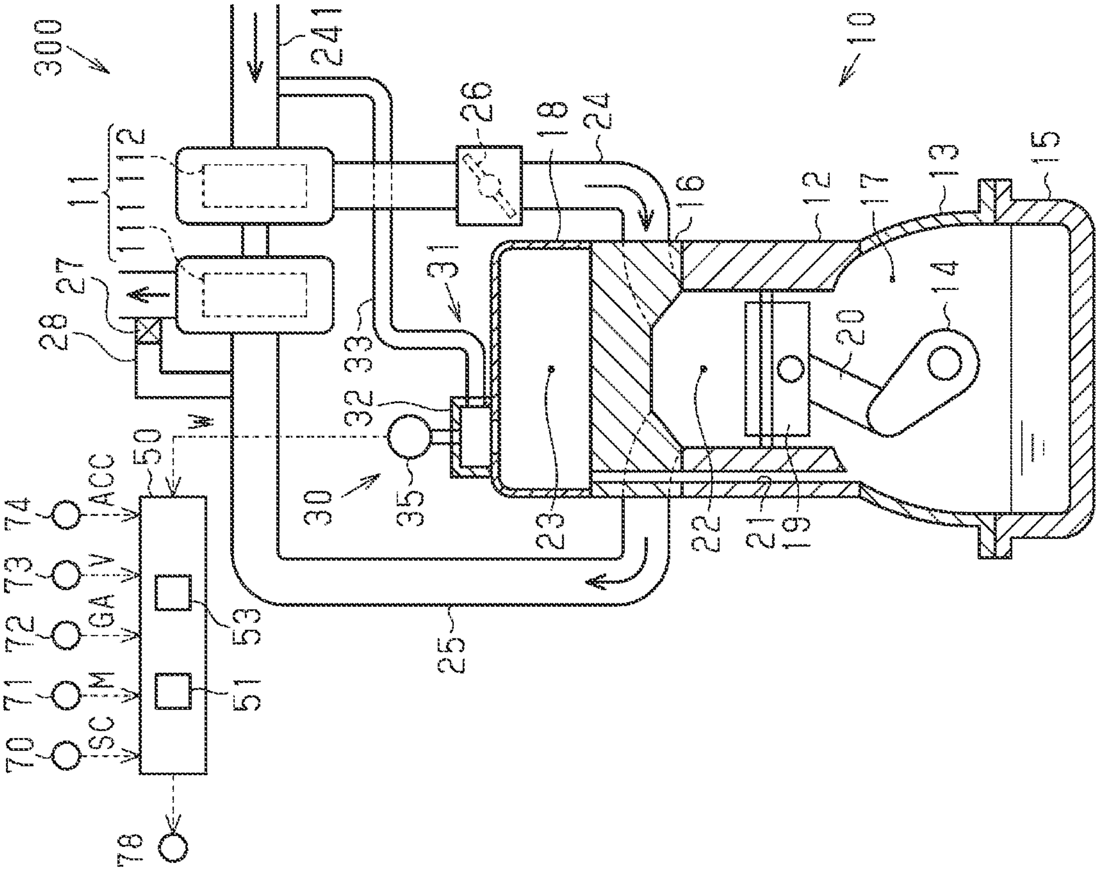
FIG. 1 illustrates a schematic configuration of an internal combustion engine.

As illustrated in FIG. 1, a vehicle 300 includes an internal combustion engine 10. The internal combustion engine 10 is a drive source for the vehicle 300. That is, the internal combustion engine 10 is an in-vehicle internal combustion engine.

The internal combustion engine 10 includes a cylinder block 12, a crankcase 13, an oil pan 15, and a crankshaft 14. The crankcase 13 is positioned below the cylinder block 12. The crankcase 13 is attached to the cylinder block 12. The crankcase 13 includes a crank chamber 17. The crank chamber 17 is a space defined inside the crankcase 13. The crank chamber 17 houses the crankshaft 14. The oil pan 15 is positioned below the crankcase 13. The oil pan 15 is attached to the crankcase 13. The oil pan 15 stores oil for lubrication.

The internal combustion engine 10 includes a plurality of cylinders 22, a plurality of pistons 19, and a plurality of connecting rods 20. In FIG. 1, only one of the cylinders 22 is illustrated. The same applies to the pistons 19 and the connecting rods 20. The cylinders 22 are spaces defined inside the cylinder block 12. In the cylinders 22, an air-fuel mixture of fuel and intake air is combusted. The cylinders 22 communicate with the crank chamber 17. The pistons 19 are positioned in the cylinders 22. The pistons 19 reciprocate in the cylinders 22. The pistons 19 are coupled to the crankshaft 14 via the connecting rods 20. The crankshaft 14 is rotated in accordance with operation of the pistons 19.

The internal combustion engine 10 includes a cylinder head 16 and a head cover 18. The cylinder head 16 is positioned above the cylinder block 12. The cylinder head 16 is attached to the cylinder block 12. The head cover 18 is positioned above the cylinder head 16. The head cover 18 is attached to the cylinder head 16.

The internal combustion engine 10 includes an intake passage 24 and an exhaust passage 25. The intake passage 24 is a passage for introducing intake air to the cylinders 22. The intake passage 24 is connected to the cylinders 22. A downstream portion of the intake passage 24 is constituted as an intake port defined in the cylinder head 16. The exhaust passage 25 is a passage for discharging exhaust from the cylinders 22. The exhaust passage 25 is connected to the cylinders 22. An upstream portion of the exhaust passage 25 is constituted as an exhaust port defined in the cylinder head 16.

The internal combustion engine 10 includes a throttle valve 26, a supercharger 11 driven by exhaust, a bypass passage 28, and a waste gate valve (hereinafter referred to as a “WGV”) 27. The throttle valve 26 is positioned in the middle of the intake passage 24. The degree of opening of the throttle valve 26 is adjustable. An amount (hereinafter referred to simply as an “intake air amount”) GA of intake air is varied in accordance with the degree of opening of the throttle valve 26. The supercharger 11 includes a compressor wheel 112 and a turbine wheel 111. The compressor wheel 112 is positioned in the intake passage 24 upstream of the throttle valve 26. The turbine wheel 111 is positioned in the middle of the exhaust passage 25. The bypass passage 28 is connected to the exhaust passage 25 upstream and downstream of the turbine wheel 111. The WGV 27 is positioned at the downstream end of the bypass passage 28. The degree of opening of the WGV 27 is adjustable. The amount of exhaust that flows through the bypass passage 28 is varied in accordance with the degree of opening of the WGV 27. When the WGV 27 is opened to a degree of opening less than fully open, the amount of exhaust that passes through the turbine wheel 111 is increased. Then, the turbine wheel 111 is rotated in accordance with the flow of the exhaust. At this time, the compressor wheel 112 is rotated together with the turbine wheel 111. Then, the compressor wheel 112 compresses and feeds intake air. That is, the intake air is supercharged.

The internal combustion engine 10 includes a blow-by gas processing mechanism 30 that returns a blow-by gas in the crank chamber 17 to the intake passage 24. The blow-by gas is a combustion gas that leaks out of the cylinders 22 to the crank chamber 17. The blow-by gas processing mechanism 30 includes a communication path 21, a storage space 23, a joint 32, and blow-by gas piping 33. The storage space 23 is a space defined by the cylinder head 16 and the head cover 18. The communication path 21 penetrates the cylinder block 12 and the cylinder head 16. The communication path 21 communicates between the crank chamber 17 and the storage space 23. The joint 32 is attached to the head cover 18. One end of the blow-by gas piping 33 is connected to the joint 32. The blow-by gas piping 33 communicates with the storage space 23 via the joint 32. The other end of the blow-by gas piping 33 is connected to an upstream intake passage 241 that is a portion of the intake passage 24 upstream of the compressor wheel 112. The communication path 21, the storage space 23, the joint 32, and the blow-by gas piping 33 constitute the blow-by gas passage 31. That is, the blow-by gas passage 31 communicates between the crank chamber 17 and the upstream intake passage 241. In the blow-by gas passage 31, a blow-by gas in the crank chamber 17 is led to the storage space 23 through the communication path 21. The storage space 23 temporarily stores the blow-by gas. Then, the blow-by gas in the storage space 23 is led to the upstream intake passage 241 through the blow-by gas piping 33.

The internal combustion engine 10 includes a positive crankcase ventilation (PCV) pressure sensor 35, a crank position sensor 70, an atmospheric pressure sensor 71, and an airflow meter 72. The PCV pressure sensor 35 is installed at the joint 32. The PCV pressure sensor 35 detects the absolute pressure in the joint 32. The pressure in the joint 32 is equal to the pressure in the blow-by gas piping 33. That is, the PCV pressure sensor 35 detects a PCV pressure W that is the pressure in the blow-by gas piping 33. The crank position sensor 70 is positioned in the vicinity of the crankshaft 14. The crank position sensor 70 detects a rotational position SC of the crankshaft 14. The atmospheric pressure sensor 71 detects an atmospheric pressure M that is the pressure around the internal combustion engine 10. The airflow meter 72 is positioned in the intake passage 24 upstream of the compressor wheel 112. The airflow meter 72 detects an intake air amount GA. These sensors repeatedly output a signal that matches information detected by the sensors themselves to a diagnosis device 50 to be discussed later.

The vehicle 300 includes a voltage sensor 73, an accelerator sensor 74, and an indication lamp 78. The voltage sensor 73 detects a battery voltage V that is the voltage of a battery of the vehicle 300. The accelerator sensor 74 detects an accelerator operation amount ACC that is the amount of depression of an accelerator pedal of the vehicle 300. The voltage sensor 73 and the accelerator sensor 74 repeatedly output a signal that matches information detected by the sensors themselves to the diagnosis device 50 to be discussed later. The indication lamp 78 is positioned in a vehicle cabin of the vehicle 300. The indication lamp 78 is provided to indicate an abnormality in the blow-by gas piping 33.

Abnormality Diagnosis Device

The vehicle 300 includes an abnormality diagnosis device (hereinafter referred to simply as a "diagnosis device") 50 for the internal combustion engine 10. The diagnosis device 50 may be constituted as one or more processors that execute various processes in accordance with a computer program (software). The diagnosis device 50 may be constituted as one or more dedicated hardware circuits, such as application specific integrated circuits (ASICs), that execute at least a part of the various processes, or circuitry that includes a combination of such circuits. The processor includes a central processing unit (CPU) 51 and a memory 53 such as a random access memory (RAM) and a read only memory (ROM). The memory 53 stores a program code or an instruction configured to cause the CPU 51 to execute a process. The memory 53, that is, a computer readable medium, includes any medium that is available and accessible to a general-purpose or dedicated computer. The memory 53 includes a non-volatile memory that is electrically rewritable.

The diagnosis device 50 repeatedly receives detection signals output from the sensors of the vehicle 300. The diagnosis device 50 diagnoses the state of the internal combustion engine 10 as a diagnosis target based on such detection signals. In addition, the diagnosis device 50 controls various portions of the internal combustion engine 10. For example, the diagnosis device 50 calculates an engine rotational speed NE that is the rotational speed of the crankshaft 14 based on the rotational position SC of the crankshaft 14. The diagnosis device 50 repeatedly calculates the engine rotational speed NE. The diagnosis device 50 calculates a required load factor that is a required value of an engine load factor based on the calculated engine rotational speed NE, accelerator operation amount ACC, etc. Then, the diagnosis device 50 controls the throttle valve 26 so as to be able to obtain the intake air amount GA that achieves the required load factor. When the required load factor is high to a certain degree, the diagnosis device 50 controls the WGV 27 to a degree of opening less than fully open. Accordingly, the supercharger 11 performs supercharging. The diagnosis device 50 causes the supercharger 11 to perform supercharging in a situation in which the intake air amount GA is considerably large. The engine load factor is a parameter that determines the amount of air to be charged into the cylinders 22, and is a value obtained by dividing the amount of air that flows into each of the cylinders 22 per combustion cycle by a reference air amount. The reference air amount is varied in accordance with the engine rotational speed NE.

Abnormality in Blow-by Gas Piping

The diagnosis device 50 can execute a diagnosis process of diagnosing whether an abnormality has occurred in the blow-by gas piping 33. This diagnosis process diagnoses an abnormality (hereinafter referred to as a "leakage abnormality") in which a blow-by gas leaks out of the blow-by gas piping 33. A leakage abnormality in the blow-by gas piping 33 is caused when one end of the blow-by gas piping 33 is detached from the joint 32, when the other end of the blow-by gas piping 33 is detached from the upstream intake passage 241, or when the blow-by gas piping 33 is damaged. The blow-by gas piping 33 constitutes a portion of the blow-by gas passage 31 on the intake passage 24 side with respect to the installation location of the PCV pressure sensor 35. That is, the diagnosis device 50 diagnoses an abnormality in the portion of the blow-by gas passage 31 on the intake passage 24 side with respect to the installation location of the PCV pressure sensor 35 in the diagnosis process.

Leakage abnormalities are classified into the following two patterns from the viewpoint of the degree of the amount of the blow-by gas that leaks out. In a first pattern, the inside of the blow-by gas piping 33 completely communicates with the atmosphere as the blow-by gas piping 33 is completely detached from the joint 32 or the upstream intake passage 241 or as the blow-by gas piping 33 is damaged to have a considerably large opening area. Hereinafter, the state in which the inside of the blow-by gas piping 33 completely communicates with the atmosphere is referred to as a "complete communication state". A large amount of blow-by gas leaks out when a leakage abnormality in the pattern of the complete communication state is caused. In a second pattern, the inside of the blow-by gas piping 33 slightly communicates with the atmosphere as the blow-by gas piping 33 is damaged to have a small opening area. Hereinafter, the state in which the inside of the blow-by gas piping 33 slightly communicates with the atmosphere is referred to as a "partial communication state". A leakage abnormality in this pattern may also be caused as the connection between the blow-by gas piping 33 and the joint 32 is slightly loosened or when the connection between the blow-by gas piping 33 and the upstream intake passage 241 is slightly loosened. Not a large amount of blow-by gas leaks out when a leakage abnormality in the pattern of the partial communication state is caused.

The diagnosis device 50 uses the PCV pressure W to diagnose the presence or absence of the leakage abnormality in the diagnosis process. The relationship between the intake air amount GA and the PCV pressure W as a precondition for the diagnosis device 50 to use the PCV pressure W in the diagnosis process will be described. The relationship between the intake air amount GA and the PCV pressure W may be varied in accordance with the engine rotational speed NE as discussed later. The relationship between the intake air amount GA and the PCV pressure W is described for a certain specific range of the engine rotational speed NE.

Figure 2:
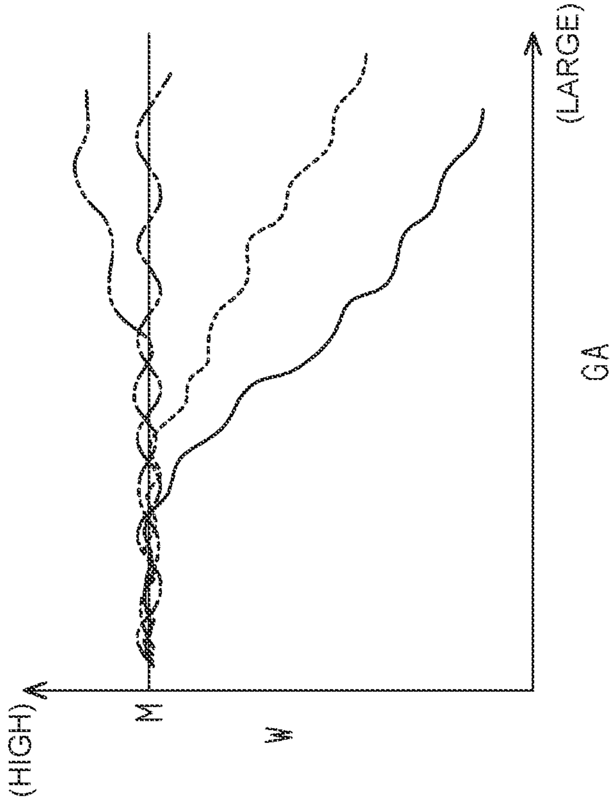
FIG. 2 illustrates the relationship between an intake air amount and a PCV pressure for a specific range of an engine rotational speed.

First, the relationship between the intake air amount GA and the PCV pressure W at the time when the blow-by gas piping 33 is normal is described. When supercharging is performed by the supercharger 11, that is, when the intake air amount GA is considerably large, the internal pressure of the upstream intake passage 241 becomes negative with respect to the atmospheric pressure M. Accordingly, the blow-by gas in the blow-by gas passage 31 flows into the upstream intake passage 241. As a result, the PCV pressure W becomes lower than the atmospheric pressure M. The amount of blow-by gas that flows into the upstream intake passage 241 becomes larger since the negative pressure in the upstream intake passage 241 becomes higher as the intake air amount GA is larger. That is, the PCV pressure W becomes lower as the intake air amount GA is larger, as indicated by the continuous line in FIG. 2. In other words, when the blow-by gas piping 33 is normal, the PCV pressure W is varied in conjunction with variations in the intake air amount GA in a situation in which a negative pressure is caused in the upstream intake passage 241 as the supercharger 11 is driven.

On the contrary, the relationship between the intake air amount GA and the PCV pressure W at the time when a leakage abnormality is caused in the blow-by gas piping 33 is as follows. First, the complete communication state is described. When the blow-by gas piping 33 is in the complete communication state, the inside of the blow-by gas piping 33 is completely open to the atmosphere. Therefore, in this case, the PCV pressure W has a value in the vicinity of the atmospheric pressure M, irrespective of whether the intake air amount GA is large or small, as indicated by the long dashed short dashed line in FIG. 2. The PCV pressure W is not substantially varied in conjunction with variations in the intake air amount GA, even if such variations are caused.

Next, the partial communication state is described. When the blow-by gas piping 33 is in the partial communication state, the main cause of such a state is often damage to the blow-by gas piping 33, as described above. In the partial communication state, unlike the complete communication state, the following occurs, depending on the opening area due to the damage. That is, when a negative pressure is caused in the upstream intake passage 241 as supercharging is performed by the supercharger 11, a certain amount of blow-by gas flows into the upstream intake passage 241. Then, the PCV pressure W becomes lower than the atmospheric pressure M. The amount of blow-by gas that flows into the upstream intake passage 241 becomes larger since the negative pressure in the upstream intake passage 241 becomes higher as the intake air amount GA is larger. Therefore, the PCV pressure W becomes lower as the intake air amount GA is larger, as indicated by the dashed line in FIG. 2. However, the PCV pressure W is close to the atmospheric pressure M compared to when the blow-by gas piping 33 is normal, since the inside of the blow-by gas piping 33 communicates with the atmosphere via the damaged portion. The degree of variations in the PCV pressure W with respect to variations in the intake air amount GA is small in a situation in which a negative pressure is caused in the upstream intake passage 241 compared to when the blow-by gas piping 33 is normal.

A clogging abnormality may be caused in the blow-by gas piping 33, besides the leakage abnormality described above. The clogging abnormality is caused when the blow-by gas piping 33 is clogged. When a clogging abnormality is caused, the blow-by gas stored in the storage space 23 cannot flow into the upstream intake passage 241 via the blow-by gas passage 31. On the other hand, the blow-by gas is continuously generated when the internal combustion engine 10 is operating. The amount of generated blow-by gas tends to become larger as the intake air amount GA is larger. Therefore, the PCV pressure W becomes higher than the atmospheric pressure M when the intake air amount GA is large to a certain degree, as indicated by the long dashed double-short dashed line in FIG. 2.

Overview of Diagnosis Process

The diagnosis device 50 can execute a first process as a part of the diagnosis process. In the first process, the diagnosis device 50 specifies a specific period H, for which an intake air fluctuation amount ΔGA is equal to or more than a prescribed value K, the intake air fluctuation amount ΔGA being the amount of fluctuations in the intake air amount GA per unit time. The prescribed value K will be discussed later. In the present embodiment, the diagnosis device 50 performs the first process while the intake air amount GA is increasing. That is, the amount of fluctuations in the intake air amount GA per unit time is the amount of increase in the intake air amount GA per unit time. The diagnosis device 50 stores the unit time in advance. The unit time is considerably short, and less than 1 second, e.g. 0.1 seconds. The unit time has been determined based on experiments or simulations as a length of time that allows extracting a rise in the intake air amount GA that accompanies acceleration etc. of the vehicle 300, for example. The unit time is sufficiently longer than the data sampling interval of sensors that are used in the diagnosis process. Thus, the sensors output a plurality of detection signals to the diagnosis device 50 within the unit time.

The diagnosis device 50 can execute a second process as a part of the diagnosis process. In the second process, the diagnosis device 50 calculates a pressure fluctuation amount WA that is the amount of fluctuations in the PCV pressure W during the specific period H specified in the first process. The specific definition of the pressure fluctuation amount WA will be discussed later.

The diagnosis device 50 repeatedly performs the first process and the second process a number of times of determination NTh during a plurality of specific periods H. Consequently, the diagnosis device 50 calculates a number of pressure fluctuation amounts WA, the number corresponding to the number of times of determination NTh. The diagnosis device 50 stores the number of times of determination NTh in advance. The number of times of determination NTh has been determined based on experiments or simulations, for example, as a minimum number of pressure fluctuation amounts WA required to obtain an accurate diagnosis result.

The diagnosis device 50 can execute a third process as a part of the diagnosis process. In the third process, the diagnosis device 50 determines the presence or absence of a leakage abnormality in the blow-by gas piping 33 based on a determination parameter Y obtained by correcting the pressure fluctuation amount WA. The pressure fluctuation amount WA may be increased and reduced in accordance with the magnitude of the intake air fluctuation amount ΔGA during the specific period H. The determination parameter Y is a value obtained by correcting the pressure fluctuation amount WA to a value that is not significantly affected by the intake air fluctuation amount ΔGA. In the third process, the diagnosis device 50 calculates an integrated parameter Z as an integrated value of a plurality of determination parameters Y obtained by repeatedly performing the first process and the second process. The diagnosis device 50 determines that a leakage abnormality is caused when the integrated parameter Z is less than a determination threshold ZTh. The diagnosis device 50 stores the determination threshold ZTh in advance. The determination threshold ZTh has been determined based on experiments or simulations, for example, as a minimum value of the integrated parameter Z that may be taken when the blow-by gas piping 33 is normal. The determination threshold ZTh has a value determined on the assumption of the number of times of determination NTh.

Determination Air Amount

The diagnosis device 50 performs the first process, and then the second process, only when a specific execution condition is met. When the blow-by gas piping 33 is normal, the intake air amount GA and the PCV pressure W are varied in conjunction with each other only when the intake air amount GA is considerably large and a negative pressure is caused in the upstream intake passage 241. When a negative pressure is not caused in the upstream intake passage 241, the intake air amount GA and the PCV pressure W are not varied in conjunction with each other even when the blow-by gas piping 33 is normal, and thus it is not likely that there is a difference in the pressure fluctuation amount WA between when a leakage abnormality is caused in the blow-by gas piping 33 and during normal times. In the light of this respect, the diagnosis device 50 performs the first process when an execution condition that the intake air amount GA is equal to or more than a determination air amount GATh that ensures the occurrence of a negative pressure in the upstream intake passage 241 is met. That is, in the present embodiment, the diagnosis device 50 starts to execute the first process when the intake air amount GA has become equal to or more than the determination air amount GATh while the intake air amount GA is increasing. Thus, the diagnosis device 50 specifies the specific period H for a period for which the intake air amount GA continues to be equal to or more than the determination air amount GATh. The determination air amount GATh prescribed by a first map to be discussed later is substantially constant in the scale of the unit time.

Figure 3:
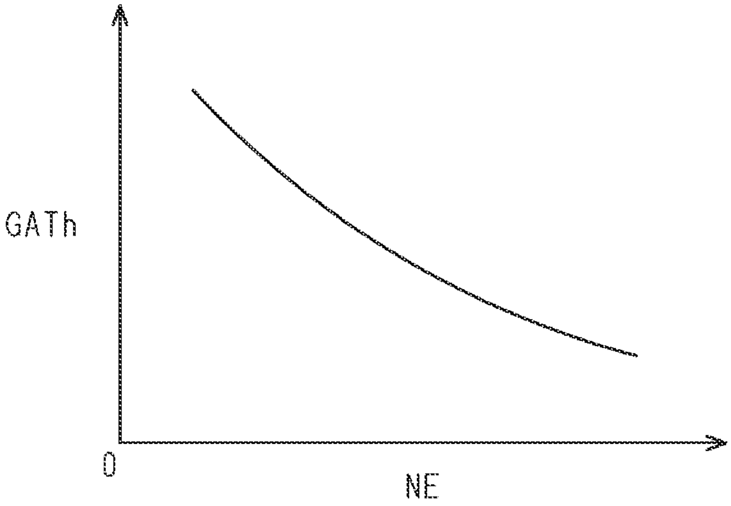
FIG. 3 illustrates the relationship between the engine rotational speed and a determination air amount.

The diagnosis device 50 variably sets the determination air amount GATh in accordance with the engine rotational speed NE. The diagnosis device 50 stores the first map in advance as information that is necessary to that end. As illustrated in FIG. 3, the first map represents the correlation between the engine rotational speed NE and the determination air amount GATh. The first map has been prepared based on experiments or simulations, for example. The reason for variably setting the determination air amount GATh in accordance with the engine rotational speed NE will be described later in the functions section.

In the first map, as illustrated in FIG. 3, the determination air amount GATh has a smaller value when the engine rotational speed NE is high than when the engine rotational speed NE is low. In the first map, particularly, the determination air amount GATh has a smaller value as the engine rotational speed NE is higher. The determination air amount GATh at each engine rotational speed NE has a value that is equal to or more than a minimum value of the intake air amount GA in a situation in which a negative pressure is caused in the upstream intake passage 241 at the engine rotational speed NE. Further, the determination air amount GATh at each engine rotational speed NE is determined as a value at which the PCV pressure W is varied considerably significantly in conjunction with the intake air amount GA at the engine rotational speed NE. When a negative pressure is caused in the upstream intake passage 241, the intake air amount GA exceeds the determination air amount GATh basically when supercharging is performed by the supercharger 11. However, the intake air amount GA may exceed the determination air amount GATh in a situation in which supercharging is not performed by the supercharger 11, depending on the operating state of the internal combustion engine 10.

Prescribed Value

Figure 4:
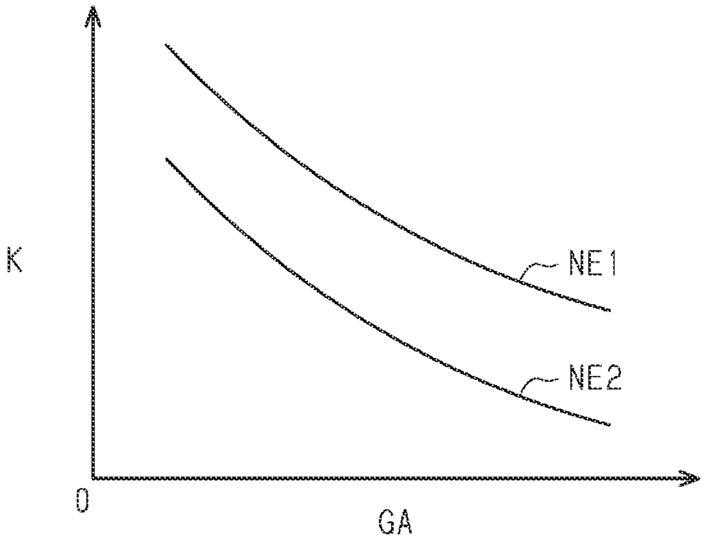
FIG. 4 illustrates the relationship between the intake air amount, a prescribed value, and the engine rotational speed.

The determination air amount GATh is considered to be an indicator that allows grasping a situation in which a negative pressure is caused in the upstream intake passage 241 as an average environmental field during the specific period H. A situation in which a negative pressure is caused in the upstream intake passage 241 can be roughly covered using the determination air amount GATh as a threshold for executing the first process. When a negative pressure is caused in the upstream intake passage 241, however, the degree of variations in the PCV pressure W with respect to instantaneous variations in the intake air amount GA may be different in accordance with the magnitude of the negative pressure. For example, the degree of variations in the PCV pressure W with respect to variations in the intake air amount GA during the specific period H may be small when the negative pressure as an average value during the specific period H is relatively low. In such a situation, the PCV pressure W are not fluctuated significantly unless the intake air fluctuation amount ΔGA during the specific period H becomes large, even if the blow-by gas piping 33 is normal. That is, it is not likely that there is a difference in the pressure fluctuation amount WA between when a leakage abnormality is caused and during normal times, unless the intake air fluctuation amount ΔGA during the specific period H becomes large. In the light of this respect, the diagnosis device 50 variably sets the prescribed value K for specifying the specific period H in the first process in accordance with the intake air amount GA at the time when the first process is executed. The diagnosis device 50 stores a second map in advance as information to be provided to that end. As illustrated in FIG. 4, the second map represents the correlation between the intake air amount GA and the prescribed value K. Particularly, the second map represents the correlation between the intake air amount GA and the prescribed value K for a plurality of different engine rotational speeds NE. The engine rotational speeds NE include a variety of small to large values, from minimum to maximum values of the engine rotational speed NE that may be taken when the internal combustion engine 10 is in the operating state. To use the second map, values between adjacent engine rotational speeds NE may be obtained through interpolation, for example. In the example in FIG. 4, for convenience, the correlation between the intake air amount GA and the prescribed value K is represented for only two engine rotational speeds NE, namely a first value NE1 and a second value NE2. The second value NE2 corresponds to a higher speed than the first value NE1. The reason for setting the prescribed value K to different values for each engine rotational speed NE will be described later in the functions section. The second map has been prepared based on experiments or simulations, for example.

As illustrated in FIG. 4, the second map basically has the follow feature. When focus is placed on a certain specific engine rotational speed NE, the prescribed value K has a larger value when the intake air amount GA is small than when the intake air amount GA is large. Particularly, the prescribed value K has a larger value as the intake air amount GA is smaller at a certain specific engine rotational speed NE. This feature is provided because it is not likely that there is a distinct difference in the pressure fluctuation amount WA between when a leakage abnormality is caused and during normal times when the intake air amount GA is small and there is a low negative pressure, unless the intake air fluctuation amount ΔGA is large, as described above. In the second map, meanwhile, when focus is placed on a certain specific intake air amount GA, the prescribed value K has a larger value when the engine rotational speed NE is low than when the engine rotational speed NE is high. Particularly, the prescribed value K has a larger value as the engine rotational speed NE is lower at a certain specific intake air amount GA. The reason for providing this feature will be described later in the functions section. In the second map, the prescribed value K is determined as a value that makes a distinct difference in the pressure fluctuation amount WA between when a leakage abnormality is caused and during normal times at each engine rotational speed NE.

Specific Process Procedure of Diagnosis Process

The diagnosis device 50 repeatedly executes the diagnosis process during operation of the internal combustion engine 10. When the diagnosis process is performed for the first time after the internal combustion engine 10 is started, the diagnosis device 50 performs a reset process, as in step S32 to be discussed later, before the diagnosis process is started. After that, the diagnosis device 50 starts the diagnosis process. Therefore, the integrated parameter Z and a number of times of integration N have been set to "0" when the first diagnosis process is started after the internal combustion engine 10 is started.

Figure 5:
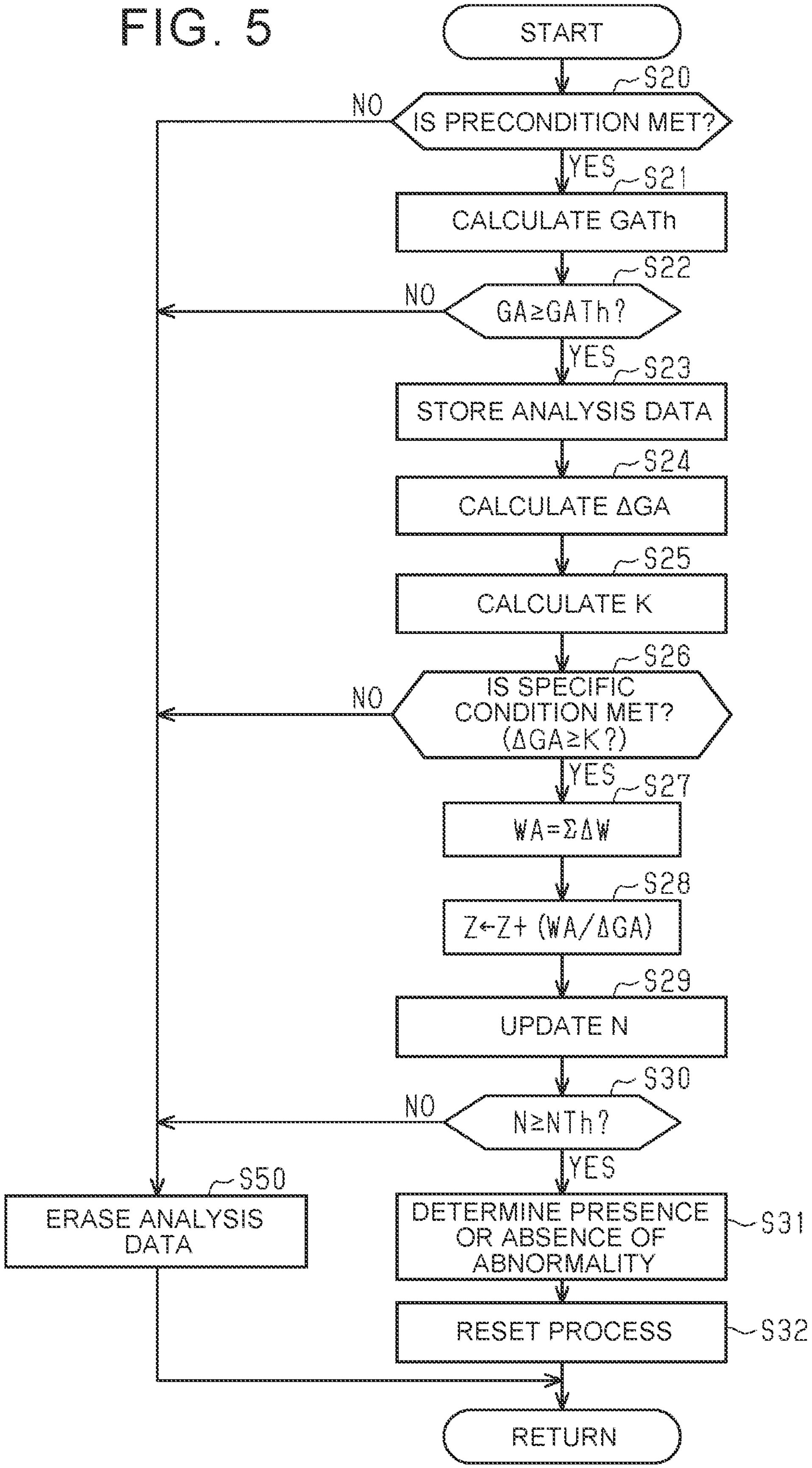
FIG. 5 is a flowchart illustrating a process procedure of a diagnosis process.

As illustrated in FIG. 5, when the diagnosis process is started, the diagnosis device 50 first executes a process in step S20. In step S20, the diagnosis device 50 determines whether a precondition has been met. The precondition is that the following two items are met, for example. The first item is that the PCV pressure W has not continuously been higher than the atmospheric pressure M in a history of the PCV pressure W for a certain period received from the PCV pressure sensor 35. The second item is that the latest battery voltage V received from the voltage sensor 73 is equal to or more than a determination voltage VTh. Regarding the first item, there is a possibility that a clogging abnormality is caused when the PCV pressure W continues to be higher than the atmospheric pressure M. The first item is provided in order to eliminate such a situation. The certain period has been determined in advance through experiments or simulations, for example, as a length of time that allows considering that a clogging abnormality has been caused. Regarding the second item, there is a possibility that a necessary voltage cannot be applied to the sensors that are used for diagnosis when the battery voltage V is less than the determination voltage VTh. The diagnosis device 50 determines whether the precondition is met by referencing the history of the PCV pressure W received from the PCV pressure sensor 35, the atmospheric pressure M received from the atmospheric pressure sensor 71, and the battery voltage V received from the voltage sensor 73. When the precondition is not met (step S20: NO), the diagnosis device 50 proceeds to step S50.

In step S50, the diagnosis device 50 erases analysis data. When the determination in step S20 is NO and the process proceeds to step S50, the diagnosis device 50 has not stored analysis data after the start of the diagnosis process. Therefore, the diagnosis device 50 performs substantially nothing in this case. In this respect, the same applies when the determination in step S22 to be discussed later is NO and the process proceeds to step S50. When the process in step S50 is executed, the diagnosis device 50 temporarily ends the series of processes of the diagnosis process. After that, the diagnosis device 50 executes the process in step S20 again.

When the precondition is met in step S20 (step S20: YES), on the other hand, the diagnosis device 50 proceeds to step S21. In step S21, the diagnosis device 50 calculates a determination air amount GATh to be used in step S22 to be discussed later. Specifically, the diagnosis device 50 references the first map and the latest engine rotational speed NE. Then, the diagnosis device 50 calculates a determination air amount GATh corresponding to the latest engine rotational speed NE based on the first map. After that, the diagnosis device 50 proceeds to step S22.

In step S22, the diagnosis device 50 determines whether the intake air amount GA is equal to or more than the determination air amount GATh. Specifically, the diagnosis device 50 references the latest intake air amount GA received from the airflow meter 72 and the determination air amount GATh calculated in step S21. When the latest intake air amount GA is not equal to or more than the determination air amount GATh (step S22: NO), the diagnosis device 50 proceeds to step S50. When the latest intake air amount GA is equal to or more than the determination air amount GATh (step S22: YES), on the other hand, the diagnosis device 50 proceeds to step S23. Examples of the situation in which the process proceeds to step S23 include a situation in which the intake air amount GA is increased from being less than the determination air amount GATh to the determination air amount GATh or more while the intake air amount GA is increasing. That is, a rise in the intake air amount GA is covered.

In step S23, the diagnosis device 50 stores analysis data over the unit time. Specifically, the diagnosis device 50 chronologically stores a plurality of intake air amounts GA received from the airflow meter 72 since the process proceeds to step S23 until the unit time elapses. The diagnosis device 50 treats these chronological data as first analysis data D1. The diagnosis device 50 also chronologically stores a plurality of PCV pressures W received from the PCV pressure sensor 35 since the process proceeds to step S23 until the unit time elapses. The diagnosis device 50 treats these chronological data as second analysis data D2. The diagnosis device 50 may measure the unit time by counting up a timer for time measurement, for example. The diagnosis device 50 proceeds to step S24 when the unit time elapses since the process proceeds to step S23.

In step S24, the diagnosis device 50 calculates an intake air fluctuation amount ΔGA. Specifically, the diagnosis device 50 references the first analysis data D1 stored in step S23. Then, the diagnosis device 50 specifies an initial intake air amount GA, in the time series of the first analysis data D1, as a start air amount. The diagnosis device 50 also specifies a final intake air amount GA, in the time series of the first analysis data D1, as an end air amount. Then, the diagnosis device 50 calculates a value obtained by subtracting the start air amount from the end air amount as the intake air fluctuation amount ΔGA. After that, the diagnosis device 50 proceeds to step S25.

In step S25, a prescribed value K to be used in step S26 to be discussed later is calculated. Specifically, the diagnosis device 50 references the second map, the start air amount specified in step S24, and the engine rotational speed NE at the timing when the start air amount is received. Then, the diagnosis device 50 calculates a prescribed value K corresponding to the start air amount and the engine rotational speed NE based on the second map. After that, the diagnosis device 50 proceeds to step S26.

In step S26, the diagnosis device 50 determines whether a specific condition is met. The specific condition is that both the following items (A) and (B) are met.

(A) The intake air fluctuation amount ΔGA calculated in step S24 is equal to or more than the prescribed value K calculated in step S25.

(B) The start air amount specified in step S24 is the minimum value in the time series of the first analysis data D1, and the end air amount specified in step S24 is the maximum value in the time series of the first analysis data D1.

For the item (A), the diagnosis device 50 determines whether the item (A) is met by comparing the intake air fluctuation amount ΔGA calculated in step S24 and the prescribed value K calculated in step S25. For the item (B), the diagnosis device 50 determines whether the item (B) is met by comparing each intake air amount GA in the times series of the first analysis data D1 with the start air amount and the end air amount. When the specific condition is not met (step S26: NO), the diagnosis device 50 proceeds to step S50. When the specific condition is met (step S26: YES), on the other hand, the diagnosis device 50 specifies the period for which analysis data are stored in step S23 as a specific period H. After that, the diagnosis device 50 proceeds to step S27. The diagnosis device 50 specifies a specific period H through the processes in step S24, step S25, and step S26 in the manner described above. The processes in step S24, step S25, and step S26 constitute the first process.

When the determination in step S26 turns YES, it is meant that the intake air amount GA continues increasing as the time transitions in the time series of the first analysis data D1. As described above, the PCV pressure W becomes lower in accordance with an increase in the intake air amount GA in a situation in which the intake air amount GA is equal to or more than the determination air amount GATh (step S22: YES). Due to the relationship between the intake air amount GA and the PCV pressure W, when the intake air amount GA continues increasing in the time series of the first analysis data D1, the PCV pressure W continues decreasing as the time transitions in the time series of the second analysis data D2.

In step S27, the diagnosis device 50 calculates a pressure fluctuation amount WA. Specifically, the diagnosis device 50 references the second analysis data D2 that contain chronological data on the PCV pressure W. Then, the diagnosis device 50 specifies an initial PCV pressure W, in the time series of the second analysis data D2, as a reference pressure. Next, the diagnosis device 50 calculates a difference between each (hereinafter referred to as a "data element") of the plurality of PCV pressures W that constitute the time series of the second analysis data D2 and the reference pressure. That is, the diagnosis device 50 calculates, for each data element, a value obtained by subtracting the data element from the reference pressure as a pressure difference value ΔW. Then, the diagnosis device 50 calculates a value obtained by integrating all the pressure difference values ΔW as the pressure fluctuation amount WA. As described above, the PCV pressure W continues decreasing in the time series of the second analysis data D2 in a situation in which the process proceeds to step S27. Therefore, the value of each data element is basically smaller than the value of the reference pressure. However, the value of the data element may be larger than the value of the reference pressure because of noise etc. The diagnosis device 50 calculates the pressure difference value ΔW as "0" when the value of the data element is larger than the value of the reference pressure. When the pressure fluctuation amount WA is calculated, the diagnosis device 50 proceeds to step S28. The process in step S27 constitutes the second process.

In step S28, the diagnosis device 50 updates the integrated parameter Z. Specifically, the diagnosis device 50 first divides the pressure fluctuation amount WA calculated in step S27 by the intake air fluctuation amount ΔGA calculated in step S24. Then, the diagnosis device 50 determines the obtained value as the determination parameter Y. Next, the diagnosis device 50 adds the determination parameter Y to the integrated parameter Z that is presently stored. Then, the diagnosis device 50 stores the obtained value as the latest integrated parameter Z. At this time, the diagnosis device 50 overwrites the integrated parameter Z that has been stored so far with the latest integrated parameter Z. After that, the diagnosis device 50 proceeds to step S29.

In step S29, the diagnosis device 50 updates the number of times of integration N. That is, the diagnosis device 50 adds "1" to the number of times of integration N that is presently stored. Then, the diagnosis device 50 stores the obtained value as the latest number of times of integration N. At this time, the diagnosis device 50 overwrites the number of times of integration N that has been stored so fart with the latest number of times of integration N. After that, the diagnosis device 50 proceeds to step S30.

In step S30, the diagnosis device 50 determines whether the number of times of integration N updated in step S29 is equal to or more than the number of times of determination NTh. When the number of times of integration N updated in step S29 is not equal to or more than the number of times of determination NTh (step S30: NO), the diagnosis device 50 proceeds to step S50.

When the number of times of integration N is equal to or more than the number of times of determination NTh in step S30 (step S30: YES), on the other hand, the diagnosis device 50 proceeds to step S31. In step S31, the diagnosis device 50 determines the presence or absence of a leakage abnormality in the blow-by gas piping 33 based on the latest integrated parameter Z that is presently stored. When the integrated parameter Z is equal to or more than the determination threshold ZTh, the diagnosis device 50 determines that the blow-by gas piping 33 is normal. In this case, the diagnosis device 50 turns off a leakage flag that indicates occurrence of a leakage abnormality, for example. When the integrated parameter Z is not equal to or more than the determination threshold ZTh, on the other hand, the diagnosis device 50 determines that a leakage abnormality has been caused in the blow-by gas piping 33. In this case, the diagnosis device 50 turns on the leakage flag, and turns on the indication lamp 78, for example. After that, the diagnosis device 50 proceeds to step S32. The diagnosis device 50 obtains the result of a diagnosis as to the presence or absence of an abnormality in the blow-by gas passage 31 through the processes in step S28, step S29, step S30, and, step S31 in the manner described above. The processes in step S28, step S29, step S30, and, step S31 constitute the third process. The diagnosis device 50 uses information as to whether the leakage flag is on or off as information for controlling the internal combustion engine 10, for example.

In step S32, the diagnosis device 50 performs a reset process. That is, the diagnosis device 50 resets the number of times of integration N and the integrated parameter Z to "0". The diagnosis device 50 also erases the analysis data. After that, the diagnosis device 50 temporarily ends the series of processes of the diagnosis process. After that, the diagnosis device 50 executes the process in step S20 again. When the indication lamp 78 is turned on in step S31, the diagnosis device 50 keeps on the indication lamp 78 until an instruction to turn off the indication lamp 78 is received in response to an operation by an occupant, for example.

Functions of Embodiment (A) Overall Flow of Diagnosis Process

The overall flow of the diagnosis process will be described using a case where the blow-by gas piping 33 is normal as an example. It is assumed that the internal combustion engine 10 is now being supercharged. It is assumed that the intake air amount GA is increasing. It is assumed that the intake air amount GA has reached the determination air amount GATh at time t1 as the intake air amount GA is increased as illustrated in FIG. 6A (step S22: YES). Then, the diagnosis device 50 stores analysis data over a unit time (step S23). When the intake air fluctuation amount ΔGA during the unit time is equal to or more than the prescribed value K (step S26: YES), the diagnosis device 50 specifies a period corresponding to the unit time as a specific period (hereinafter referred to as a "first specific period") H1. As described above, when the supercharger 11 is performing supercharging and a negative pressure is caused in the upstream intake passage 241, the intake air amount GA and the PCV pressure W are varied in conjunction with each other. Thus, when the intake air amount GA is increased from a first air amount GA1 to a second air amount GA2 in the first specific period H1 as illustrated in FIG. 6A, the PCV pressure W is decreased from a first pressure W1 to a second pressure W2 in the first specific period H1 as indicated by the continuous line in FIG. 6B. The diagnosis device 50 calculates a pressure fluctuation amount WA corresponding to an area hatched in FIG. 6B as an index that indicates the degree of variations in the PCV pressure W (step S27). The diagnosis device 50 updates the integrated parameter Z using the determination parameter Y that matches the pressure fluctuation amount WA (step S28). That is, the integrated parameter Z is increased by one step at end time t2 of the first specific period H1 as indicated by the continuous line in FIG. 6C.

It is assumed that the intake air amount GA continues increasing also after the first specific period H1 is ended as illustrated in FIG. 6A. In this case, the diagnosis device 50 specifies a unit time after the first specific period H1 as a second specific period H2. Then, the diagnosis device 50 updates the integrated parameter Z using the determination parameter Y that matches the pressure fluctuation amount WA in the same manner as described above. Then, the integrated parameter Z is increased by one step at end time t3 of the second specific period H2 as indicated by the continuous line in FIG. 6C. The integrated parameter Z is successively increased in this manner.

When a leakage abnormality is caused in the blow-by gas piping 33, the inside of the blow-by gas piping 33 communicates with the atmosphere. Therefore, variations in the PCV pressure W that match variations in the intake air amount GA become smaller. It is assumed that the first specific period H1 has come when the blow-by gas piping 33 is in the partial communication state. It is assumed that the intake air amount GA is increased from the first air amount GA1 to the second air amount GA2. In this case, the PCV pressure W is only lowered from the first pressure W1 to a third pressure W3 that is higher than the second pressure W2 in the first specific period H1, as indicated by the long dashed double-short dashed line in FIG. 6B. The pressure fluctuation amount WA at this time is smaller than the pressure fluctuation amount WA at the time when the blow-by gas piping 33 is normal. In this case, an integrated parameter ZA at end time t2 of the first specific period H1 is smaller than an integrated parameter Z1 at the time when the blow-by gas piping 33 is normal, as indicated by the long dashed double-short dashed line in FIG. 6C. In this manner, the pressure fluctuation amount WA and hence the integrated parameter Z become smaller when a leakage abnormality is caused in the blow-by gas piping 33. Using this respect, the diagnosis device 50 determines that a leakage abnormality has been caused in the blow-by gas piping 33 when the integrated parameter Z at the time when the number of times of update of the integrated parameter Z has reached the number of times of determination NTh is small (step S31).

(B) Relationship Between Determination Air Amount and Engine Rotational Speed

In relation to the content of the first map, the diagnosis device 50 sets the determination air amount GATh to a smaller value as the engine rotational speed NE is higher. The reason for variably setting the determination air amount GATh in accordance with the engine rotational speed NE in this manner will be described.

The relationship between the intake air amount GA and the PCV pressure W for a case where the blow-by gas piping 33 is normal is compared between when the engine rotational speed NE is in a first range R1 and when the engine rotational speed NE is in a second range R2 as illustrated in FIG. 7. The upper limit value of the first range R1 is smaller than the lower limit value of the second range R2. FIG. 7 schematically illustrates the relationship between the intake air amount GA and the PCV pressure W in an easily understandable manner. The relationship between the intake air amount GA and the PCV pressure W may include fine fluctuations such as those in FIG. 2, to be exact. FIG. 7 exaggerates the difference between when the engine rotational speed NE is in the first range R1 and when the engine rotational speed NE is in the second range R2, in order to facilitate understanding of such a difference.

An amount of reduction in the PCV pressure W caused when the intake air amount GA is increased by a certain constant value is referred to as a "PCV variation amount". That is, the PCV variation amount is an index that indicates the degree of variations in the PCV pressure W with respect to variations in the intake air amount GA. When the engine rotational speed NE is in the first range R1, the PCV variation amount is large only in a situation in which the intake air amount GA is considerably large, e.g. when the intake air amount GA is equal to or more than a predetermined air amount L, as indicated by the continuous line in FIG. 7. As the PCV variation amount becomes larger, the amount of reduction in the PCV pressure W with respect to the atmospheric pressure M also accordingly becomes larger to a certain degree. Examples of the situation in which the intake air amount GA is large when the engine rotational speed NE is relatively low include a situation in which the vehicle is traveling on an uphill road. When the engine rotational speed NE is in the second range R2, the PCV variation amount is large even if the intake air amount GA is equal to or less than the predetermined air mount L, as indicated by the long dashed double-short dashed line in FIG. 7, unlike when the engine rotational speed NE is in the first range R1. For example, when the vehicle is traveling at a constant speed on an expressway, there may occur a situation in which the intake air amount GA is small when the engine rotational speed NE is relatively high. By reflecting the existence of such a situation, the PCV variation amount is large, whether the intake air amount GA is small or large, when the engine rotational speed NE is in the second range R2, as indicated by the long dashed double-short dashed line in FIG. 7. In this manner, the range of the intake air amount GA in which the PCV variation amount becomes large is different in accordance with the engine rotational speed NE. In other words, the range of the intake air amount GA in which a negative pressure is caused in the upstream intake passage 241 and the PCV pressure W is varied in conjunction with the intake air amount GA is different in accordance with the engine rotational speed NE, Thus, in the above configuration, the determination air amount GATh is variably set in accordance with the engine rotational speed NE. Consequently, only a situation in which the PCV pressure W is varied in conjunction with the intake air amount GA can be detected with high precision, whether the engine rotational speed NE is low or high. In other words, a suitable diagnosis situation that is a situation in which the pressure fluctuation amount WA tends to be different between when a leakage abnormality is caused and during normal times can be detected with high precision, whether the engine rotational speed NE is low or high. When the determination air amount GATh is variably set in accordance with the engine rotational speed NE, a suitable diagnosis situation can be detected not only in a certain specific range of the intake air amount GA, but also in a wide range of the intake air amount GA that is varied in accordance with the engine rotational speed NE. Specifically, the range of the intake air amount GA in which a suitable diagnosis situation is detected is expanded as the engine rotational speed NE is higher. Thus, a large number of suitable diagnosis situations can be detected.

(C) Relationship Between Prescribed Value and Engine Rotational Speed

In relation to the content of the second map, the diagnosis device 50 sets the prescribed value K to a larger value as the engine rotational speed NE is lower on condition that the intake air amount GA is constant. The reason for variably setting the prescribed value K in accordance with the engine rotational speed NE in this manner will be described.

The PCV variation amount is compared between when the engine rotational speed NE is in the first range R1 and when the engine rotational speed NE is in the second range R2 for a case where the intake air amount GA is equal to or more than the predetermined air amount L in FIG. 7, for example. In this case, the PCV variation amount tends to be smaller when the engine rotational speed NE is in the former range than when the engine rotational speed NE is in the latter range. While the suitable diagnosis situation can be detected as a candidate for the specific period H by using the determination air amount GATh, it is not likely that the difference in the pressure fluctuation amount WA between when a leakage abnormality is caused and during normal times is large when the PCV variation amount is small in a situation in which the blow-by gas piping 33 is normal.

Thus, in the present embodiment, the prescribed value K is set to a larger value when the engine rotational speed NE is low than when the engine rotational speed NE is high. In this case, only a case where the intake air fluctuation amount ΔGA is large can be extracted as a specific period H, as a target period for an abnormality diagnosis, when the engine rotational speed NE is low. In a situation in which the intake air fluctuation amount ΔGA is large, the pressure fluctuation amount WA is large if the blow-by gas piping 33 is normal. The difference in the pressure fluctuation amount WA between when a leakage abnormality is caused and during normal times becomes distinct when a situation in which the pressure fluctuation amount WA is large is determined as a target period for an abnormality diagnosis. As a result, it is easy to determine the presence or absence of a leakage abnormality.

Effects of Embodiment (1) In the present embodiment, the determination air amount GATh is set to a smaller value as the engine rotational speed NE is higher. Thus, as described in (B) of the functions section of the embodiment, the pressure fluctuation amount WA can be calculated in a situation in which the pressure fluctuation amount WA tends to be different between when a leakage abnormality is caused and during normal times, whether the engine rotational speed NE is low or high. An accurate determination result can be obtained by determining the presence or absence of a leakage abnormality in the blow-by gas piping 33 based on the pressure fluctuation amount WA calculated in such a situation. Moreover, as described in (B) of the functions section of the embodiment, a large number of situations in which the pressure fluctuation amount WA tends to be different between when a leakage abnormality is caused and during normal times can be detected, which allows securing as many opportunities to update the integrated parameter Z as possible, and hence as many opportunities to determine the presence or absence of a leakage abnormality as possible.

(2) In the present embodiment, the determination air amount GATh is variably set in accordance with the engine rotational speed NE, and further the prescribed value K is set to a larger value as the engine rotational speed NE is lower. Thus, as described in (C) of the functions section of the embodiment, an erroneous determination as to the presence or absence of a leakage abnormality in the blow-by gas piping 33 can be reliably prevented.

Modifications

The above embodiment can be modified as follows. The above embodiment and the following modifications can be combined with each other as long as no technical contradiction occurs.

The content of setting of the specific condition for specifying the specific period H is not limited to the example according to the above embodiment. The specific period H may be a period that covers variations in the intake air amount GA such as an increase in the intake air amount GA, for example. The specific period H may be a period that meets a condition that the intake air fluctuation amount ΔGA is equal to or more than the prescribed value K in the course of variations in the intake air amount GA. The specific condition may have a content that allows specifying such a specific period H. The item (B) may be changed, for example, to change the content of the specific condition. From the viewpoint of covering variations in the intake air amount GA, the item (B) may have a content that allows determining that the intake air amount GA is increasing as the tendency in the entire time series of the first analysis data D1. In determining such a content, the following requirement may be adopted as the item (B). That is, the requirement is that, in orthogonal coordinates with the horizontal axis representing time and the vertical axis representing the intake air amount GA, the inclination of the regression line of the time series of the intake air amount GA is positive.

The item (B) may be omitted from the specific condition. When the intake air fluctuation amount ΔGA is equal to or more than the prescribed value K in the scale of the unit time according to the above embodiment, it is highly likely that the intake air amount GA is increasing in the time series of the first analysis data D1 in most cases. That is, the specific period H can cover variations in the intake air amount GA even if the item (B) is omitted.

The manner of setting the unit time is not limited to the example according to the above embodiment. The unit time may be 1 second or more. The intake air fluctuation amount ΔGA can be calculated if the airflow meter 72 can detect the intake air amount GA at least twice within the unit time. The pressure fluctuation amount WA can be calculated if the PCV pressure sensor 35 can detect the PCV pressure W at least twice within the unit time. The specific condition may be set to have an appropriate content in accordance with the unit time.

The pressure fluctuation amount WA is not limited to an integration of pressure difference values ΔW. For example, the absolute value of the difference between the maximum value and the minimum value in the time series of the second analysis data D2 may be determined as the pressure fluctuation amount WA. The pressure fluctuation amount WA may be a value that reflects the magnitude of the degree of fluctuations in the PCV pressure W within the specific period H.

The specific period H may be specified while the intake air amount GA is decreasing after the intake air amount GA that had been increasing turned to decrease. The pressure fluctuation amount WA during a decrease in the intake air amount GA may be calculated. As described above, the intake air amount GA and the PCV pressure W are varied in conjunction with each other in a situation in which a negative pressure is caused in the upstream intake passage 241. Thus, the PCV pressure W is varied as the intake air amount GA is varied, even while the intake air amount GA is decreasing, in a situation in which a negative pressure is caused in the upstream intake passage 241. Specifically, the PCV pressure W is increased as the intake air amount GA is decreased. The pressure fluctuation amount WA during such an increase in the PCV pressure W may be calculated. When the pressure fluctuation amount WA is calculated for the specific period H for which the intake air amount GA is decreasing, the various contents of the diagnosis process, such as a method of calculating an intake air fluctuation amount ΔGA, a method of determining a specific condition, and a method of calculating a pressure fluctuation amount WA, for example, may be changed as appropriate. Regarding the intake air fluctuation amount ΔGA, for example, the absolute value of the difference between the start air amount and the end air amount in the first analysis data D1 may be determined as the intake air fluctuation amount ΔGA.

Also when the specific period H is specified while the intake air amount GA is decreasing, the specific period H may be specified for a period for which a situation in which the intake air amount GA is equal to or more than the determination air amount GATh continues. It is assumed that a condition that the intake air amount GA is equal to or more than the determination air amount GATh is met at a certain specific timing. In this case, it is expected that the intake air amount GA continues to be equal to or more than the determination air amount GATh for the period in the scale of the unit time according to the above embodiment. Thus, also when the specific period H is specified while the intake air amount GA is decreasing, specification of the specific period H may be started when the intake air amount GA has become equal to or more than the determination air amount GATh. That is, the execution condition for specifying the specific period H is that the intake air amount GA is equal to or more than the determination air amount GATh, as in the above embodiment. While the intake air amount GA is decreasing, however, the intake air amount GA may become less than the determination air amount GATh while the above unit time elapses. In the light of this respect, the specific condition may include the following content when the specific period H is specified while the intake air amount GA is decreasing. That is, the specific condition includes the end air amount in the first analysis data D1 being equal to or more than the determination air amount GATh. The determination air amount GATh may be the determination air amount GATh to be used to determine whether the above execution condition is met, or may be a value separately calculated based on the engine rotational speed NE at a timing corresponding to the end air amount.

In calculating a prescribed value K, it is not essential to use the intake air amount GA and the engine rotational speed NE at the start timing of the specific period H as in the above embodiment. For example, an average value of the intake air amount GA during the specific period H and an average value of the engine rotational speed NE during the specific period H may be used to calculate a prescribed value K corresponding to such values. A prescribed value K may be calculated using the intake air amount GA and the engine rotational speed NE that represent the specific period H.

The method of determining the intake air fluctuation amount ΔGA is not limited to the example according to the above embodiment. The intake air fluctuation amount ΔGA may represent the degree of variations in the intake air amount GA per unit time. In calculating the intake air fluctuation amount ΔGA, a method other than the method that uses the first analysis data D1 may be adopted. For example, the diagnosis device 50 may calculate the absolute value of the difference between intake air amounts GA received from the airflow meter 72 at two consecutive timings as the intake air fluctuation amount ΔGA. In this case, the reception interval of detection signals from the airflow meter 72 may be treated as the unit time. When the intake air fluctuation amount ΔGA is equal to or more than the prescribed value K, a period since one of the two intake air amounts GA is received until the other is received may be specified as the specific period H. The prescribed value K at this time may be calculated based on the intake air amount GA first received and the engine rotational speed NE at the timing of the reception, for example. When the intake air fluctuation amount ΔGA is calculated in the aspect of the present modification, the specific period H may be specified as follows, for example. That is, a period for which the intake air fluctuation amount ΔGA is repeatedly calculated and the intake air fluctuation amount ΔGA repeatedly calculated continues to be equal to or more than the prescribed value K may be specified as the specific period H. Also when the intake air fluctuation amount ΔGA is calculated in the aspect of the present modification, the intake air fluctuation amount ΔGA may be calculated in a situation in which the intake air amount GA is equal to or more than the determination air amount GATh.

In calculating the intake air fluctuation amount ΔGA in the aspect of the above modification, intake air amounts GA successively received from the airflow meter 72 may be thinned out before being used to calculate the intake air fluctuation amount ΔGA. That is, every three or four pieces of data on the intake air amount GA successively received from the airflow meter 72, for example, may be used to calculate the intake air fluctuation amount ΔGA, rather than two pieces of such data consecutively received are used to calculate the intake air fluctuation amount ΔGA. The interval of pieces of data on the intake air amount GA to be used to calculate the intake air fluctuation amount ΔGA may be determined in advance.

In calculating the pressure fluctuation amount WA, it is not essential to use the second analysis data D2, as in calculating the intake air fluctuation amount ΔGA. As with the method of calculating the intake air fluctuation amount ΔGA described above, the absolute value of the difference between PCV pressures W received from the PCV pressure sensor 35 at two different timings may be calculated as the pressure fluctuation amount WA.

It is not essential to correct the pressure fluctuation amount WA to a value that is not significantly affected by the intake air fluctuation amount ΔGA. The pressure fluctuation amount WA may be used, as it is, to update the integrated parameter Z.

The first map may be replaced with a formula or a table, unlike the example described in relation to the above embodiment. The same applies to the second map.

The manner of setting the prescribed value K in the second map is not limited to the example according to the above embodiment. The prescribed value K may not necessarily become larger as the engine rotational speed NE becomes lower. When a comparison is made between when the engine rotational speed NE is low and when the engine rotational speed NE is high for a certain specific intake air amount GA, the prescribed value K preferably has a larger value for the former than for the latter, in order to suppress an erroneous determination as to the presence or absence of a leakage abnormality. The prescribed value K constitutes a threshold for specifying the specific period H as a period for calculating the pressure fluctuation amount WA, together with the determination air amount GATh. The prescribed value K and the determination air amount GATh may be set so as to complement each other, such that there is a distinct difference in the pressure fluctuation amount WA between when a leakage abnormality is caused and during normal times at each engine rotational speed NE. The method of determining the prescribed value K can be changed, as appropriate, as long as the above matter can be secured. For example, the second map may determine the correlation between only two elements, namely the prescribed value K and the engine rotational speed NE, rather than the second map according to the above embodiment that determines the correlation among three elements, namely the prescribed value K, the intake air amount GA, and the engine rotational speed NE. Alternatively, the second map may determine the correlation between only two elements, namely the prescribed value K and the intake air amount GA. The prescribed value K may be a uniform fixed value.

The manner of setting the determination air amount GATh in the first map is not limited to the example according to the above embodiment. The determination air amount GATh may not necessarily become smaller as the engine rotational speed NE becomes higher. The determination air amount GATh may be smaller when the engine rotational speed NE is high than when the engine rotational speed NE is low. As described in relation to the above modification, the determination air amount GATh may be determined such that there is a distinct difference in the pressure fluctuation amount WA between when a leakage abnormality is caused and during normal times at each engine rotational speed NE in view of a tradeoff with the prescribed value K. As a condition as a base of the above matter, the determination air amount GATh may have a smaller value when the engine rotational speed NE is high than when the engine rotational speed NE is low. The determination air amount GATh at each engine rotational speed NE may be at least a value that is equal to or more than the minimum value of the intake air amount GA in a situation in which a negative pressure is caused in the upstream intake passage 241 at each engine rotational speed NE.

There is a correlation between the intake air amount GA and the PCV pressure W. Thus, a condition that the PCV pressure W is equal to or less than a determination pressure determined in advance may be set, in place of the condition that the intake air amount GA is equal to or more than the determination air amount GATh, as a condition for covering a situation in which a negative pressure is caused in the upstream intake passage 241. The determination pressure in this case may be a PCV pressure W at which the intake air amount GA reaches the determination air amount GATh according to the above embodiment when the blow-by gas piping 33 is normal, for example. The determination pressure is less than the atmospheric pressure M. That is, when a condition that the PCV pressure W is equal to or less than the determination pressure is set as a precondition for calculating the pressure fluctuation amount WA, the pressure fluctuation amount WA is basically not calculated when the blow-by gas piping 33 is in the complete communication state. Then, the presence or absence of a leakage abnormality is mainly diagnosed only when the blow-by gas piping 33 is in the partial communication state. It is possible to grasp a leakage abnormality without using the pressure fluctuation amount WA as far as a leakage abnormality in the complete communication state. For example, it can be determined that a leakage abnormality in the complete communication state has been caused when the PCV pressure W is maintained at a value in the vicinity of the atmospheric pressure M, even if the intake air amount GA is considerably large. On the other hand, it is necessary to make a diagnosis using the pressure fluctuation amount WA in detecting a leakage abnormality in the partial communication state. From this point of view, it is also effective to set a condition that the PCV pressure W is equal to or less than the determination pressure, as described above, in making a diagnosis as to the presence or absence of a leakage abnormality only when the blow-by gas piping 33 is in the partial communication state.

When the determination pressure is used in place of the determination air amount GATh as in the above modification, the determination pressure may be variably set in accordance with the engine rotational speed NE from the same viewpoint as the above embodiment.

In specifying the specific period H, a different parameter that serves as an index of the intake air fluctuation amount ΔGA may be used, rather than the intake air fluctuation amount ΔGA itself. Examples of such a parameter include the accelerator operation amount ACC. There is a correlation between increase and decrease in the accelerator operation amount ACC and increase and decrease in the intake air amount GA. Thus, the correlation between increase and decrease in the accelerator operation amount ACC and increase and decrease in the intake air amount GA has been studied in advance. It is possible to specify the specific period H using information on transitions in the accelerator operation amount ACC by setting a prescribed value dedicated to the accelerator operation amount ACC corresponding to the prescribed value K for the intake air fluctuation amount ΔGA. A period for which the amount of fluctuations in the accelerator operation amount ACC per unit time is equal to or more than the dedicated prescribed value may be specifies as the specific period H for which the intake air fluctuation amount ΔGA is equal to or more than the prescribed value K. The amount of fluctuations in the accelerator operation amount ACC per unit time may be calculated from chronological data on the accelerator operation amount ACC during the unit time determined in advance, or may be determined as the difference between accelerator operation amounts ACC received from the accelerator sensor 74 at two consecutive timings.

When the prescribed value dedicated to the accelerator operation amount ACC is used as in the above modification, the prescribed value may be variably set in accordance with the engine rotational speed NE from the same viewpoint as the above embodiment.

The manner of determining the presence or absence of a leakage abnormality in the blow-by gas piping 33 is not limited to the example according to the above embodiment. The above manner of determination may use the pressure fluctuation amount WA. For example, the presence or absence of a leakage abnormality may be determined based on a value obtained by multiplying a plurality of pressure fluctuation amounts WA. The presence or absence of a leakage abnormality may be determined based on only the pressure fluctuation amount WA calculated once. Any determination method may be used as long as the presence or absence of a leakage abnormality can be determined appropriately.

A processing device that controls the internal combustion engine 10 and the diagnosis device 50 may be constituted as separate processing devices. The diagnosis device 50 may receive information that is necessary to perform the diagnosis process.

The overall configuration of the internal combustion engine is not limited to the example according to the above embodiment. For example, a variable-capacity supercharger that includes nozzle vanes may be adopted as the supercharger. A supercharger driven by power of the crankshaft 14 may be adopted as the supercharger, rather than an exhaust-driven supercharger.

The installation location of the PCV pressure sensor 35 may be changed from the example according to the above embodiment. For example, the PCV pressure sensor 35 may be provided in the middle of the blow-by gas piping 33. In this case, the presence or absence of a leakage abnormality can be determined for a portion of the blow-by gas piping 33 on the intake passage side with respect to the installation location of the PCV pressure sensor 35. The PCV pressure sensor 35 can precisely detect fluctuations in the pressure in a portion between the upstream intake passage 241 as a negative pressure generation source and the installation location of the PCV pressure sensor 35.

A sensor that detects a gauge pressure that is a pressure relative to the atmospheric pressure M may be adopted as the PCV pressure sensor.

The configuration of the blow-by gas passage is not limited to the example according to the above embodiment. The blow-by gas passage may communicate between the crank chamber 17 and the upstream intake passage 241. The blow-by gas passage may be a passage that directly connects between the crank chamber 17 and the upstream intake passage 241 not via the storage space 23 or the communication path 21. The PCV pressure sensor 35 may be installed in the middle of such a blow-by gas passage.

What is claimed is:

1. An internal combustion engine abnormality diagnosis device, wherein:

the internal combustion engine abnormality diagnosis device is intended for an internal combustion engine that includes a supercharger, a blow-by gas passage that communicates between a portion of an intake passage upstream of a compressor wheel of the supercharger and an inside of a crankcase, a positive crankcase ventilation (PCV) pressure sensor that is installed in the blow-by gas passage and that detects a pressure in the blow-by gas passage as a PCV pressure, and a crankshaft;

the internal combustion engine abnormality diagnosis device executes a first process of specifying, as a specific period, a period for which an amount of fluctuations in an intake air amount per unit time is greater than or equal to a threshold value on condition that the intake air amount is greater than or equal to a determination air amount, wherein the threshold value is calculated based on a start air amount and an engine rotational speed, a second process of calculating an amount of fluctuations in the PCV pressure during the specific period, and a third process of determining, based on the amount of fluctuations in the PCV pressure, presence or absence of a leakage abnormality in a portion of the blow-by gas passage on the intake passage side with respect to a location at which the PCV pressure sensor is installed;

the internal combustion engine abnormality diagnosis device calculates the engine rotational speed that is a rotational speed of the crankshaft based on a rotational position of the crankshaft; and the internal combustion engine abnormality diagnosis device decreases a value of the determination air amount when it is determined that a leakage abnormality exists and when a rotational speed of the crankshaft is greater than a predetermined speed threshold than when the rotational speed of the crankshaft is less than the predetermined speed threshold.

2. The internal combustion engine abnormality diagnosis device according to claim 1, wherein the internal combustion engine abnormality diagnosis device increases the threshold value when the rotational speed of the crankshaft is less than the predetermined speed threshold than when the rotational speed of the crankshaft is greater than the predetermined speed threshold.

* * * * *